Feb. 12, 1935.   C. W. ZIES   1,991,268
STEAM TRAP
Filed Sept. 22, 1932
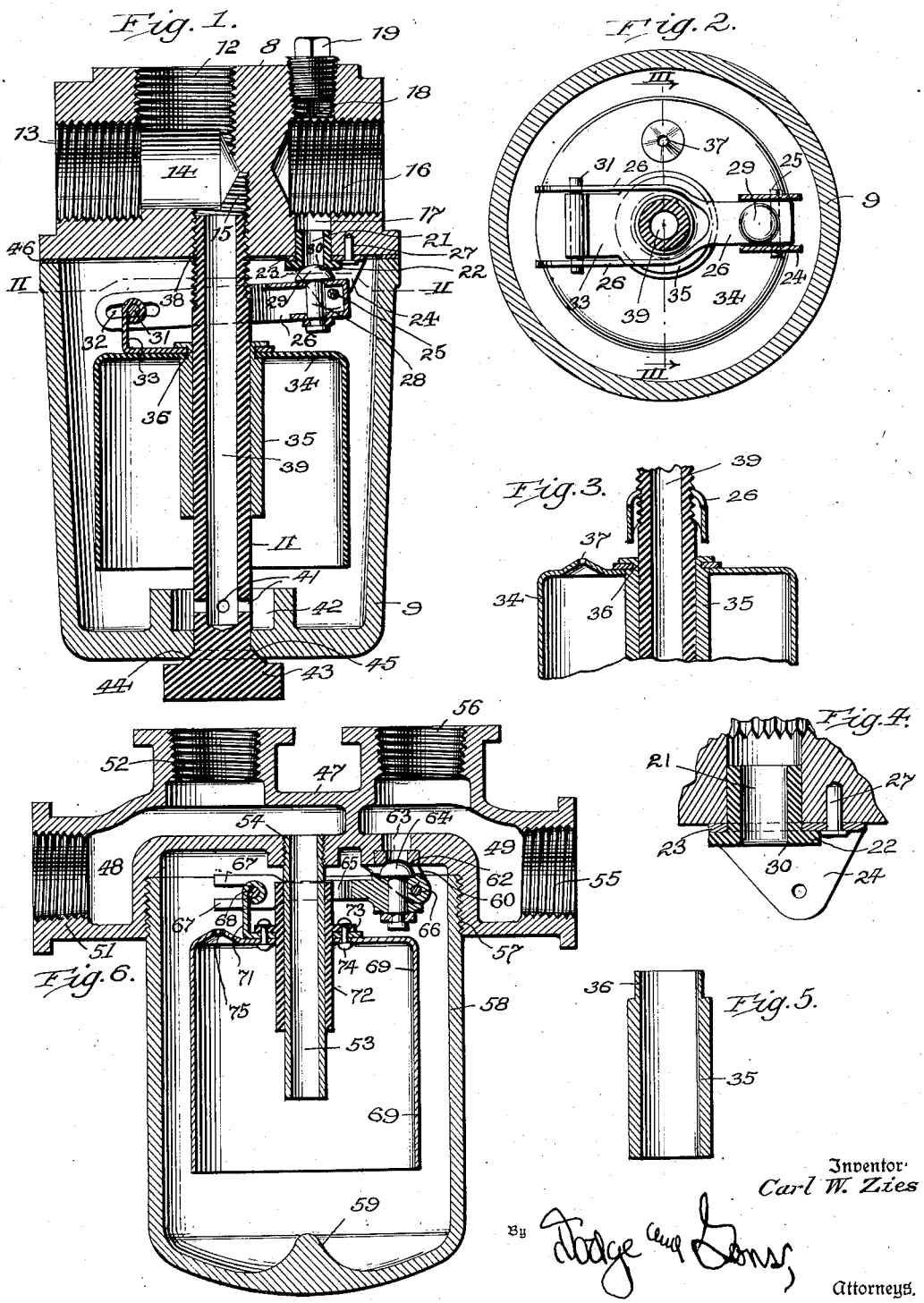
Inventor
Carl W. Zies
Attorneys.

Patented Feb. 12, 1935

1,991,268

UNITED STATES PATENT OFFICE 1,991,268

STEAM TRAP

Carl W. Zies, Lakewood, Ohio, assignor to The V. D. Anderson Company, Cleveland, Ohio, a corporation of Ohio Application September 22, 1932, Serial No. 634,369

10 Claims. (Cl. 137—103)

This invention relates to steam traps, and the main object of the invention is to produce a steam trap in which all of the operating parts are carried by the top, thereby rendering the body removable for cleaning, inspection, or repair without disturbing the pipe connections or the operating mechanism of the trap.

Another object of the invention is to produce a steam trap having a tube depending from the top of the trap, this tube serving both as an inlet and as a guide for the float.

Still another object is to provide a simple casing construction held together by a single means which also serves as an inlet connection and float guide.

Another object is to provide a trap constructed to deflect incoming gases and vapor into the float, thereby increasing its buoyancy.

Another object is to provide means for preventing velocity of incoming liquid from raising the float and closing the outlet valve under improper conditions.

Additional objects and advantages of the invention will appear from the following description, when read in connection with the accompanying drawing, in which:—

Fig. 1 is a vertical sectional view of one form of steam trap embodying this invention;

Fig. 2 is a horizontal section on line II—II of Fig. 1;

Fig. 3 is a section on line III—III of Fig. 2 through the float and guide tube shown in Fig. 1;

Fig. 4 is a fragmental section showing the outlet valve seat and float lever pivot construction;

Fig. 5 is a detail of a portion of the float guide tube before it is connected to the float; and Fig. 6 is a vertical sectional view through a modified form of trap.

Referring to the drawing, and particularly to Fig. 1, the steam trap therein shown comprises a top 8, a hollow body or bowl 9, and means comprising a hollow bolt 11 which secures these parts together and serves as an inlet tube for the gases, vapors and liquid.

The top 8 which is preferably formed from a single casting has a vertical threaded inlet connection 12 and a horizontal threaded inlet connection 13, both of which terminate in a chamber 14. Chamber 14 is connected with the interior through a threaded connection 15. Top 8 also has an outlet comprising a threaded horizontal opening 16, and a vertical passageway 17 leading into opening 16. In line with passageway 17 is a connection 18 through which access to the passageway 17 may be had. Connection 18 contains a closure plug 19. Passageway 17 contains a tubular bushing 21 having an enlarged flange 22 at its bottom end, which flange serves to aid in holding the float pivot lever support 23 in position.

The float lever pivot support 23 comprises a horizontal portion and two depending ears 24 adapted to receive a pivot pin 25, to support the forked lever 26 for vertical swinging movement about the pin 25. The portion 24 is secured to the top 8 by a pin 27.

Float lever 26, which is rotatable on the pivot 25, carries a valve comprising a spherical valve head 29 and a shank 28 secured in lever 26 and adapted to fit against an annular seat 30 formed in the lower end of bushing 21, thereby to close the outlet opening when the lever is in its uppermost position, as shown in Fig. 1.

Pivotally connected to lever 26 by pin 31 working in elongated slots 32 in the arms of the lever, is a support 33 secured to an inverted hollow bucket 34. This bucket carries coaxially with it a bushing 35 having a reduced cross section 36 at its upper end and fitting into an opening in the support 33 to which it is secured by heading down the portion 36, as shown in Fig. 1. The bucket 34 contains a vent 37, as shown in Fig. 3 of the drawing, so as to permit air to escape from the bucket during the operation of the trap. The bushing 35 is vertically slidable on the hollow bolt 11, this bolt being threaded at 38 into the connection 15. The bolt contains a chamber or passageway 39 closed at the bottom and having lateral offtake openings 41 terminating inside a cup 42 formed in the bottom of the bowl 9. The bolt 11 also has an enlarged head 43 at the bottom and connected to the body portion of the bolt by a conical surface 44 which cooperates with a counter-sunk portion 45 in the bottom of bowl 9 to form a liquid and gas tight joint when the parts are assembled, as shown. The connection between the top rim of bowl 9 and the bottom face of top 8 is sealed by a gasket 46.

It will be understood that, with the construction just described, the bowl 9 may be removed by unscrewing the bolt 11 and without disturbing the pipe connections made at 12, 13 and 16 or dismantling the float structure. The bolt after being unscrewed is withdrawn through the opening in bushing 35, and, after the bowl is cleaned, the parts may be reassembled by placing the bowl in position and passing the bolt through the bushing 35 into its threaded seat in opening 15. This construction not only facilitates inspection and repair, but the presence of the upstanding wall of cup 42 in line with the lateral openings 41 prevents the escape of steam and gases up around the float. Hence, they are deflected inside of the float to give it buoyancy. The use of a single member which serves as an inlet tube and float guide, and, at the same time, as a means for holding the parts of the trap together, simplifies the structure and materially reduces the number of operations required to assemble and disassemble the trap.

In describing the operation of the trap, it will be assumed that the trap has been installed in a new heating apparatus in which the pipe and trap lines are free from water and steam, but contain air. It will further be assumed that one of the inlet openings 12 or 13 is connected to a steam heating system, while the other is closed, and, at the same time, the outlet opening 16 is connected by a pipe to a container into which the displaced water is to be delivered.

When the steam valve is turned on, the apparatus commences to condense steam and to rise in temperature. The condensed steam or condensate flows by gravity to the trap, fills it, and overflows through the outlet valve. During this time, the bucket is in its lowermost position, in which the outlet valve is held open and the liquid entering the trap passes through the passageway 39 out of the lateral outlet ports 41 over the rim of the cup 42 into the bowl 9, and, when the bowl is full, out of outlet 16. This operation continues until gas in the form of air or steam enters the trap. This gas, being lighter than the water, is deflected upwardly by the rim of cup 42 and rises in a vertical direction into the bucket 34, thereby displacing water from the bucket until the bucket becomes buoyant and commences to float, gradually closing the outlet valve.

If the gas which has actuated the bucket is air, it will pass out through the vent in the bucket and displace the water in the bowl 9 until the float is partly out of water. When the bucket loses its buoyancy, by having lost its sustaining medium in the form of water, it drops to its lowermost position and permits the air to escape through the outlet valve. Up and down movements of the bucket continue until all of the air is driven out of the system.

When steam enters the trap, it displaces the water in the bucket and causes the bucket to become buoyant and to rise. This steam, being a condensable gas, is consumed as it seeps through the vent hole in the bucket. The outlet valve will, therefore, remain closed until water enters the trap and condenses the steam in the bucket, thereby causing it to lose its buoyancy and then to sink and open the outlet valve. This cycle of operation will be repeated upon successive deliveries of water and steam to the trap.

It will be seen that the bolt 11 not only serves as an inlet connection to the body of the trap, but it provides a guide along which the float bushing 35 can move without binding action. The space between the bushing and guide tube is sealed by capillary attraction, since it is only of sufficient size to permit free relative movement of the parts. Furthermore, the upstanding rim of cup 42 acts to deflect gases and air coming through the lateral openings 41 and to direct them inside of the bucket 34 so as to render this bucket buoyant and to prevent these gases from escaping around the sides of the bucket, where their effect may be lost. This apparatus not only offers these functional advantages, but it comprises a very simple structure composed of a small number of parts which may be readily assembled and disassembled.

In Fig. 6, there is shown a modified form of construction in which the top of the trap is composed of a casting 47 containing an inlet chamber 48 and an outlet chamber 49. Connected to the inlet chamber 48 are a plurality of threaded inlet connections 51 and 52, both of which are in communication with the interior of the trap through a hollow vertical guide tube 53 connected to the inlet chamber 48 at 54 in top 47.

The outlet chamber 49 has connected with it two outlet connections 55 and 56, respectively, threaded to receive suitable connecting pipes, it being understood that, when one of these pipes is used, the other may be closed by a plug. Threaded into the bottom of the top casting 47 at 57 is a hollow body or bowl 58 carrying an upstanding centrally disposed boss 59 at the bottom, this boss being in vertical alignment with the bottom end of inlet tube 53.

The entrance of gases and liquid into the bowl 58 is through one of the inlet connections 51 or 52, inlet chamber 48, and inlet tube 53, while egress of liquid and gases to the outlet chamber 49 is controlled by a float valve.

The float valve comprises an annular valve seat 62 recessed into the inlet end of passageway 63 connecting the interior of bowl 58 with the outlet chamber 49. Cooperating with the valve seat 62 is a spherical valve head 64 carried by a forked float lever 65 pivoted at 66 in ears 60 carried by top 47 and having bifurcated ends 67 cooperating with a pin 68 which connects the lever to a float 69 through a bent support 71 and a tubular flanged bushing 72 secured to the float by flange 73 and rivets 74. The float contains a vent opening 75 in the top.

It will be clear that the lever 65 may pivot about point 66 to move the valve head 64 into and out of contact with the valve seat 62. This movement may be brought about by actuation of the float 69 which is guided in a vertical direction by the cooperation of bushing 72 and inlet tube 53. This movement may take place without any wedging or binding action, because of the bifurcated ends 67 in the ends of lever 65 cooperating with pin 68 and support 71.

It will be understood that the operation of the modified form of trap shown in Fig. 6 is similar to the trap shown in Fig. 1, except that the boss 59 in the bottom of cup 58 acts to deflect the gases and liquid laterally away from the inside of the float. In this way, the pressure of the incoming liquid does not cause the float to be lifted to close the outlet valve at times when it should be open. Thus, throttling action and reduction of trap capacity are effectively avoided. The modified form of float offers the advantage of rendering the float operating parts readily accessible for cleaning or repairing, because the cup 58 may be unscrewed without dismantling any of the operating parts of the float or disconnecting any of the pipes from it. Furthermore, this trap offers the advantage of having both horizontal and vertical inlet and outlet connections, so that pipes may be connected to it from any direction and the remaining openings plugged. This renders the trap capable of universal use and requires that only a single form of trap be kept in stock for a variety of installations. The outlet opening 56 is disposed directly in line with the outlet valve 61, thereby making the valve seat accessible for cleaning and inspection without the provision of a special cleaning opening.

Although only two forms of steam traps embodying this invention are shown and described, it will be obvious that various changes may be made in the details within the scope of the appended claims, without departing from the spirit and scope of the invention.

What is claimed is:—

1. A steam trap comprising a casing having a top and a hollow body, said top containing inlet and outlet openings; an inlet tube depending from said top and connected to said inlet; an inverted bucket float slidably movable on and guided by said tube within said body; and an outlet valve in operative relation to said outlet opening and controlled by movements of said float.

2. A steam trap comprising a hollow body; a top containing an inlet and an outlet; an inlet tube depending from said top and connected with said inlet; an inverted bucket float slidable on said tube; an outlet valve carried by said top in operative relation to said outlet; and means for operatively connecting said float with said valve.

3. A steam trap comprising a hollow body; a top containing an inlet and an outlet; a single means for securing said body and top together and forming a fluid conducting connection between said inlet and the interior of the body; and float-controlled means for controlling the flow of liquid from said outlet.

4. A steam trap comprising a casing having a top and a hollow body, said top containing inlet and outlet openings; a bolt for securing said top and body together, said bolt containing a passageway connecting said inlet with the interior of said body; an outlet valve; a float for controlling said valve; and deflecting means within said body for directing into said float gases entering said body through said passageway.

5. A steam trap comprising a hollow body; a top containing inlet and outlet openings; a bolt for securing said body and top together, said bolt containing a passageway connecting said inlet with the interior of said body; an outlet valve; an inverted bucket float guided by said bolt for controlling said valve; and deflecting means disposed around said bolt for directing gases upwardly into said float.

6. A steam trap comprising a casing having a top and a hollow body, said top containing inlet and outlet openings; a hollow bolt for securing said parts in assembled relation and connecting said inlet with the interior of the hollow body, said bolt having at least one lateral opening near the bottom end thereof for connecting the interior of the bolt with the interior of the hollow body; a continuous upstanding rib on the bottom of said body, said rib extending above the lateral opening in the bolt and in spaced relation to it; a valve for controlling said outlet; and a float for controlling said valve.

7. A steam trap comprising a hollow body; a top having an inlet and an outlet; a valve for said outlet; an inlet tube depending from said top and connected to said inlet; an inverted bucket float operatively connected to said valve; and means disposed within said body beneath the bottom end of the inlet tube for producing lateral deflection of liquid expelled from said inlet tube.

8. A steam trap comprising a hollow body having an open upper end; a top for closing said open end, said top containing inlet and outlet openings; an inlet tube depending from said top and connected with said inlet; an outlet valve carried by said top; and an inverted bucket float embracing and slidable on said tube and connected to said valve for controlling the same, all of the parts being carried by said top to permit free removal of said body.

9. A steam trap comprising a top and a hollow body, said trap having an inlet and an outlet; a float for controlling the outlet; and a single means for securing said top and body together, for conducting fluid from said inlet to said body, and for guiding said float in its up and down movements.

10. A steam trap comprising a top and a hollow body, said trap having an inlet and an outlet; a float for controlling the outlet; and a single means for securing said top and body together, for conducting fluid from said inlet to said body, and for guiding said float in its up and down movements; said means comprising a hollow bolt closed at the head end and having lateral fluid conducting openings adjacent said closed end and forming fluid conducting communication between the hollow interior and the interior of said body.

CARL W. ZIES.